United States Patent [19]

van de Veerdonk

[11] 4,403,316

[45] Sep. 6, 1983

[54] SWING-ARM DEVICE FOR AN OPTICAL SCANNING UNIT

[75] Inventor: Johannes T. A. van de Veerdonk, Eindhoven, Netherlands

[73] Assignee: U.S. Philips Corporation, New York, N.Y.

[21] Appl. No.: 321,848

[22] Filed: Nov. 16, 1981

[30] Foreign Application Priority Data

Aug. 26, 1981 [NL] Netherlands ............... 8103960

[51] Int. Cl.³ .................... G11B 3/10; G11B 7/00
[52] U.S. Cl. ...................... 369/44; 369/215; 369/222; 369/244; 369/255
[58] Field of Search ............ 360/86; 369/43, 44, 369/45, 158, 184, 215, 219, 222, 240, 244, 250, 255

[56] References Cited

U.S. PATENT DOCUMENTS

3,830,505  8/1974  Rabinow ................... 369/43 X
4,102,536  7/1978  Clunis ........................ 369/43
4,310,918  1/1982  Hirata ........................ 369/215

Primary Examiner—Robert L. Richardson
Attorney, Agent, or Firm—Thomas A. Briody; Robert T. Mayer; Algy Tamoshunas

[57] ABSTRACT

A swing-arm device (5) for an optical disk player comprises a swing arm (16), which near one end (17) carries an optical scanning unit (6) and which is electromagnetically pivoted by means of coils (27, 28) and a permanent magnetic stator (29, 30, 49–52, 54) arranged on the swing arm. The center of mass (Z) of the pivotal assembly, inter alia comprising the swing arm and the optical scanning unit, is disposed on the pivotal axis and the two coils are disposed diametrically on both sides of the pivotal axis and exert equal pivotal forces which act in one plane which is perpendicular to the pivotal axis and which extends through the center of mass. The center of mass is disposed midway between two ball-bearings (20, 21).

7 Claims, 16 Drawing Figures

SWING-ARM DEVICE FOR AN OPTICAL SCANNING UNIT

The invention relates to a swing-arm device for writing and/or reading recording tracks in an optical disk by means of a radiation beam which is concentrated to form a radiation spot, which device comprises: a stationary frame; an optical scanning unit comprising a lens system which is movable along an optical axis; a swing arm having a first end provided with means for securing the scanning unit and having a second end opposite the first end; a swing-arm bearing arrangement for mounting the swing arm so as to be pivotable about a pivotal axis between the two ends; coil means connected to the swing arm for exerting electromagnetic pivotal forces in a plane perpendicular to the pivotal axis; and a permanent-magnetic stator comprising permanent stator-magnet means secured to the frame, which means co-operate with the coil means via an air gap.

Devices for moving and positioning optical scanning units for the contactless scanning of rotary optical disks are known in various forms. The optical disks may be video disks, rotating at a speed of 1500 or 1800 revolutions per minute, optical data-storage disks, which also rotate at high speed, or optical audio disks. As is known, it has been proposed to manufacture optical audio disks having a diameter of approximately 12 cm. The speed of rotation varies between approximately 250 and 500 revolutions per minute.

The known devices for moving and positioning optical scanning units are generally of a type in which the optical scanning unit is translated over the rotating surface of the optical disk. However, it has also been proposed to employ a swing-arm device in conjunction with an optical scanning unit which performs a limited rotary movement. Said limited rotary movement or pivotal movement is effected about a pivotal axis which is parallel to the axis of rotation of the optical disk. Advantages of a swing-arm device in comparison with a translating device are its simple bearing arrangement and drive system. In general journalling and driving rotary devices are technically easier. In translating devices it is often necessary to convert rotations into translations. The comparatively large dimensions and the comparatively high mass of the moving part of the rotary device may be a disadvantage. As a result of this such devices may become more susceptible to shocks, that is, if an apparatus in which a swing-arm device is used is subjected to a shock, this may give rise to undesired movements of the optical scanning unit.

Nevertheless, the advantages of a swing-arm device may outweigh its disadvantages, especially if optical disks of smaller diameter are used which do not rotate too fast, such as said optical audio disk. Of particular interest is a swing-arm device used in conjunction with an optical scanning unit equipped with a movable lens system for automatically focussing of a radiation beam on the information surface of the optical disk, the swing arm being included in an automatic control circuit for automatically following the track of the optical disk, which control circuit corrects tracking errors by small pivotal movements of the complete swing arm. Tracking errors may arise as a result of incorrect centering of the optical disk on a drive spindle, an eccentric position of the tracks relative to the central hole of the disk, oscillations of the tracks when the disk is not perfectly perpendicular to the axis of rotation of the drive spindle, and other random influences. In view of the frequency spectrum of the tracking errors the radial tracking system is required to have a dynamic bandwidth of at least 1000 Hz. Moreover, for the pivotal movement of the swing arm the required power should not be too high in view of the development of heat and the dimensioning of the servo circuits.

The invention aims to provide a swing-arm device of the type mentioned in the opening paragraph having a large dynamic bandwidth for pivotal movements about the pivotal axis and requiring a comparatively low power for effecting the pivotal movements, and is characterized in that a number of steps are applied in combination, namely: that the mass centre of the pivotal assembly, comprising the swing arm with the optical scanning unit, is disposed on the pivotal axis; the coil means comprise first and second coil means, which are each disposed on one side of and at equal distances from the pivotal axis, diametrically opposite each other, and which exert equal first and second pivotal forces; and the first and second pivotal forces act in one plane perpendicular to the pivotal axis. Each of these steps in itself serves to prevent undesired forces and moments being exerted on the swing-arm device. In the absence of undesired forces and moments the arm can be of a less rigid and consequently lighter construction. It has been found that, in comparison with the other parts of the swing-arm device, especially the bearing arrangement has a low rigidity. Bearing arrangements which meet requirements of freedom from play and low friction can be obtained by the use of axially preloaded ball-bearings. The balls are compressed over a very small area so that, at least in the micron range, they are elastically deformable in a comparatively easy manner. In view of the desired large bandwidth it is therefore very important to aim at a minimal bearing load. The smaller the mass of the arm is, the smaller the bearing load, so that the attainable bandwidth can be larger. Since the centre of mass of the swing-arm device is disposed on the pivotal axis this also yields the advantage that the orientation of the pivotal axis relative to the direction of the field of gravity is not critical.

Since the coil means exert a perfect moment about the pivotal axis on the swing arm, no undesired transverse forces are exerted on the swing-arm bearing arrangement during pivotal movements. As already described, this is important in view of the attainable dynamic bandwidth of the swing-arm device. However, transverse forces are also undesirable for other reasons, because they may give rise to undesired deformations in the swing-arm device and consequent displacement of the read spot. Moreover, transverse forces in the swing-arm bearing arrangement give rise to frictional forces; these also have an adverse effect on the bandwidth. Since the pivotal forces exerted by the coil means act in one plane perpendicular to the pivotal axis, no moments are exerted on the swing arm about an axis perpendicular to the pivotal axis, which moments could give rise to transverse reactive forces in the swing-arm bearing arrangement.

Also, in one embodiment the centre of gravity of the swing-arm device may be arranged in the said one plane in which the two pivotal forces act. The advantage of this is that dynamic torsional deformations about the pivotal axis owing to the moments exerted are minimized.

A further embodiment is characterized in that the swing-arm bearing arrangement comprises two bearings, one on each side of the swing arm, which bearings are disposed at substantially equal distances from the mass centre of the said pivotal assembly. This ensures that both bearings are subject to substantially equal transverse-force loads, so that neither of the bearings is subjected to a load which is heavier than necessary.

It is also of advantage to employ a further embodiment, which is characterized in that: the two bearings comprise ball-bearings; the swing-arm bearing arrangement comprises a resilient bracket for mounting one of the two ball-bearings, which bracket presents a higher resistance to forces perpendicular to the pivotal axis and to moments about the pivotal axis and a lower resistance to forces directed in accordance with the pivotal axis and to moments about axes perpendicular to the pivotal axis; and the resilient bracket is secured to the frame under axial preload, so that the two ball-bearings are axially urged towards each other.

Owing to the absence of play in the bearings, the bearings cannot adversely affect the attainable bandwidth. Owing to the deformability of the bracket about the said moment, axes alignment errors between the two ball-bearings can be compensated for elastically and without play.

A swing arm in accordance with the invention may be driven in a manner as known from swing-arm devices for moving and positioning a magnetic head over the surface of a magnetic storage disk. Such known swing-arm devices sometimes employ a flat coil which is disposed in the plane of the swing arm and which moves in an axial permanentmagnetic field between flat permanent magnets arranged at a small distance from the flat coil, parallel to the plane of the swing arm. The magnetic head is suspended in a slack system of springs so that small flexible deformations of the swing arm have substantially no influence on the position of the magnetic head above the surface of the magnetic disk. In swing-arm devices which co-operate with an optical disk flexural deformations in the swing-arm device give rise to focussing errors of the light spot. The resistance to flexural deformations consequently affects the bandwidth of the automatic focussing control system. An embodiment of the invention which provides a swing arm having a higher bending resistance but which combines all the advantages of the previous embodiments, is characterized in that: the swing arm has at least substantially the shape of a bar of rectangular cross-section, whose long sides are parallel to the pivotal axis, so that the bar comprises two side surfaces, one upper surface to be directed towards the optical disk and lower surface opposite the last-mentioned surface, which side surfaces have a height greater than the width of the upper and lower surfaces; the swing arm is formed with first and second holes, one on each side of the pivotal axis, which extend through the side walls and the stator is provided with first and second permanent stator magnets having the shape of arcs of circle, which magnets are passed through the first and the second hole. The circularly arcuate stator magnets are passed through the holes in the swing arm, so that a highly compact but nevertheless easy-to-assemble device can be obtained.

In order to obtain a large dynamic bandwidth it is important that, as already stated, the pivotal mass of the swing-arm device is sufficiently small. However, reducing the dimensions of the swing arm is only possible to a limited extent, the limits imposed depending on the type of means used for keeping the read spot positioned on the information track to be read. As is known, optical disk players comprise at least two automatic control systems, namely a focussing control system and a tracking control system. The focussing control system serves to keep the light spot automatically focussed on the information surface and to automatically correct possible error. The tracking control system serves for automatically eliminating deviations from the position of the light spot in the plane of the information surface and transverse to the direction of the information track.

For tracking purposes the optical read unit is equipped with an opto-electronic measuring unit, which measures deviations of the read spot in directions transverse to the information track. Since the information tracks are substantially concentric with the axis of rotation of the optical disk, said deviations may be referred to as radial-position errors of the light spot. In a swing-arm device the light spot follows a circularly arcuate scanning track over the information surface of the optical disk. Consequently, the read spot does not move over the information surface in a purely radial direction. The degree of curvature of the scanning path of the read spot increases as the distance between the optical read unit and the pivotal axis of the swing-arm device decreases. The deviations between the movements of the read spot relative to the track and the desired radial direction of movement will increase as the degree of curvature increases. The measuring device for measuring the radial-position errors has a limited sensitivity, so that the sensitivity of said measuring device imposes a specific limit on the maximum permissible error. In swing-arm devices for scanning optical disks this leads to a problem which greatly resembles the problems encountered with pick-up arms of record players. In record palyers this is referred to as a tracking-angle error, which is the angle formed by the radius and the tangent to the circularly arcuate scanning path followed by the stylus of the pick-up element at the point of scanning of the groove in the gramophone record. On the subject of determining the most suitable scanning path for the stylus tip of the pick up element over the gramophone record much literature is available. Reference may, for example, be made to the article "Tracking Angle" by B. B. Bauer in the magazine Electronics, March 1945, pages 110 to 115.

In the case of swing-arm devices for optical disk players it is also possible to speak of a tracking angle error. Said error may be defined as the angle, at the point where the light spot illuminates the information surface, between the radius and a tangent to the circularly arcuate scanning path. Larger tracking-angle errors are permissible as the sensitivity of the measuring device for measuring the radial-position error of the read spot relative to the track increases. An example of this is an opto-electronic measuring device using a beam splitter which splits a light beam which has been reflected by the information surface into two subbeams each cooperating with two photodiodes. The output signals of the photodiodes are added to each other and subtracted from each other in a suitable manner in order to obtain an output signal which is a measure of displacements of the read spot in a radial direction relative to the information track, a maximum tracking angle error of 20° being regarded as permissible. When this value is permissible, the most suitable scanning path can be selected by means of the said known theory, that is, that scanning path for which a minimal distance between the read spot and the pivotal axis of the swing arm is obtained and for which the tracking angle errors never exceed the maximum permissible value.

In practice this may mean that the scanning path extends from a point on the outer diameter of the information surface to a point on the inner diameter of the information surface, which are tangentially shifted relative to each other, that is, that the relevant points are disposed on different radii, which enclose a certain angle. This is also customary in record players.

A preferred embodiment of the invention will now be described in more detail, by way of example, with reference to the drawing, in which.

Figure 1:
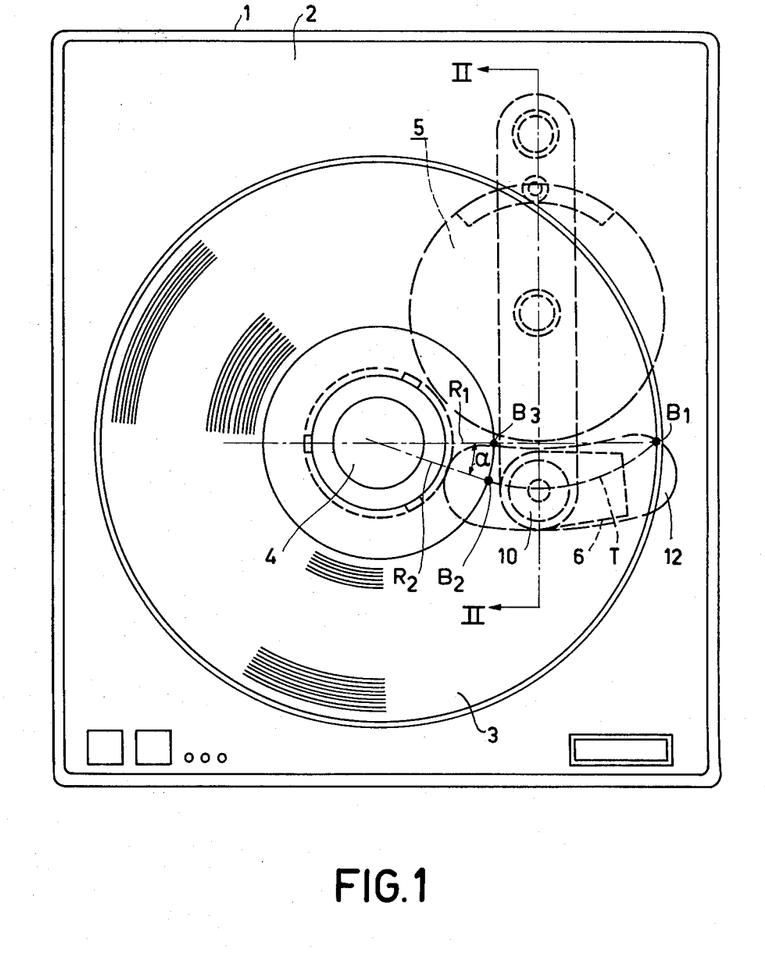
FIG. 1 is a plan view of an optical disk player at substantially full scale.

The optical audio-disk player shown in FIG. 1 comprises a lower cabinet section 1 with a deck 2. An optical audio disk 3 having a diameter of approximately 120 mm rotates on a spindle 4 in a plane of rotation which is parallel to the deck 2. The disk is read in the reflection mode by an optical scanning unit 6 with the aid of a swing-arm device 5. The axis of rotation 7 of the spindle 4, the pivotal axis 8 of the swing-arm device 5, and the optical axis 9 of a movable lens system 10 of the optical scanning unit 6 are parallel to each other and extend substantially perpendicularly to the deck 2. The spindle 4 is driven by an electric motor 11. The lens system 10 projects slightly from the deck 2 through a slot 12. The scanning unit 6 comprises a semiconductor laser, which acts as a light source, and all the optical and optoelectronic means required for reading and processing the optical information on the disk 3. As the nature and construction of the scanning unit are irrelevant to the present invention, the scanning unit will not be described in more detail. The lens system 10 concentrates a laser beam 13 to form a read spot 14 on the information surface, disposed on the upper side of the optical disk 3, which is transparent except for said information surface.

The swing-arm device comprises a stationary frame, whose major part is a base 15. A swing arm 16 has a first end 17 with clamping means for the optical scanning unit 6 and a second end 18 carrying a counter-mass 19. A swing-arm bearing arrangement for the pivotal movement of the swing arm 16 about the pivotal axis 8 comprises two ball-bearings 20 and 21 arranged on both sides of the swing arm. The ball-bearing 20 is mounted in the base 15 and the ball-bearing 21 is mounted in a resilient bracket 22. Further, the bearing arrangement comprises a bearing bolt 23 having a head 24 and a threaded portion 25 onto which a nut 26 is fitted. The inner races of the ball-bearings 20 and 21 and the swing arm 16 are retained between the nut 26 and the head 24.

Figure 2:
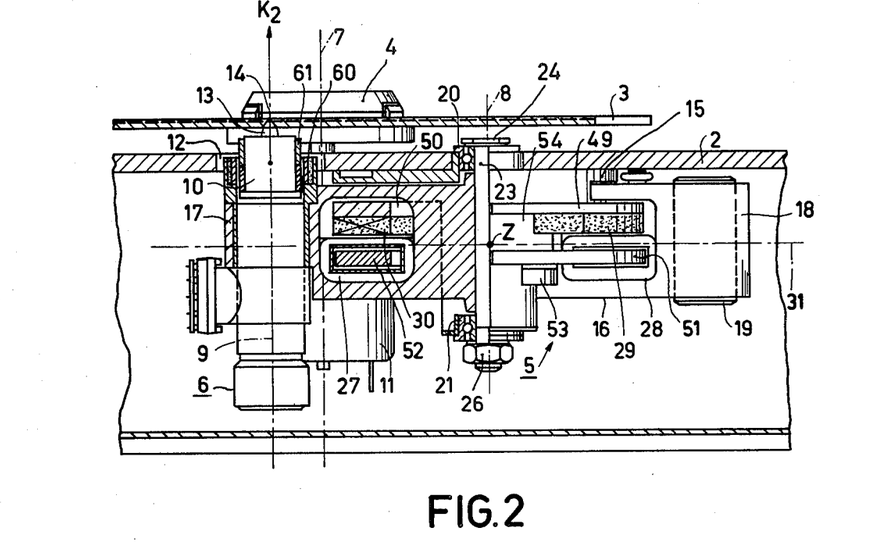
FIG. 2 is a sectional view, taken on the line II—II of a part of the optical disk player of FIG. 1, the swing-arm device being partly shown in elevation, as a slightly larger scale.

For the radial movement of the read spot 14 over the information surface of the optical disk there are provided two coils 27 and 28 and permanent magnets 29 and 30. Said magnets co-operate with the two coils via an air gap. The coils are wound and the magnets are magnetized such that each coil exerts an electromagnetic pivotal force in a plane perpendicular to the pivotal axis 8 (see FIGS. 10–14). The mass centre Z of the pivotal assembly, mainly comprising the swing arm 16 with the optical scanning unit 6, the countermass 19, and the two coils 27 and 28, is disposed on the pivotal axis 8. For pivotal movements about the pivotal axis 8 the mass moment of inertia of that part of the pivotal assembly which extends in the direction of the first end 17 of the swing arm is equal to the mass moment of inertia of the part which extends in the direction of the second end 18. Relative to the pivotal axis 8 the coils 27 and 28 are disposed diametrically opposite each other on both sides of the pivotal axis. They exert equal variable pivotal forces $K_1$ on the swing arm (see FIG. 3). These pivotal forces act in a plane passing through the centre of gravity Z and perpendicular to the pivotal axis 8. Said plane intersects the plane of drawing in accordance with a line 31 in FIG. 2 and in accordance with a line 32 in FIG. 4. In the embodiment shown the two forces $K_1$ are equal to each other and act tangentially, so that substantially no transverse force components are exerted on the bearings. The two forces are applied at equal distances from the pivotal axis 8, so that they produce pivoting moments of equal magnitude and direction. The points of application of the forces are disposed close to the parts of the swing-arm device having the largest mass, that is, the scanning unit 6 and the counter-mass 19. This has the advantage of a low dynamic flexural deformation of the swing arm 16. In the ideal case the pivotal forces would act in the centres of gravity of the principal masses, that is, in the centres of gravity of the scanning unit 6 and of the countermass 19. However, this is difficult to achieve.

The two ball-bearings 20 and 21 are disposed at equal axial distances from the centre of gravity Z. The optical axis 9 of the movable lens system 10 is disposed in a plane of symmetry of the swing arm 16 which extends through the pivotal axis 8. Said plane of symmetry intersects the plane of drawing in accordance with a line 33 in FIG. 3. A variable focussing force $K_2$, see FIG. 2, which is exerted on the lens system 10 for focussing purposes by means to be described hereinafter, consequently acts in the said plane of symmetry. Therefore, the focussing force does not produce any undesired dynamic torsional moments in the swing arm 16, the swing arm being only subjected to a bending load by the force $K_2$. The variable reaction forces, occurring in the ball-bearings 20 and 21, are equal to each other because, as already stated, the centre of gravity Z of the pivotal assembly is disposed midway between the two ball-bearings.

Figure 8:
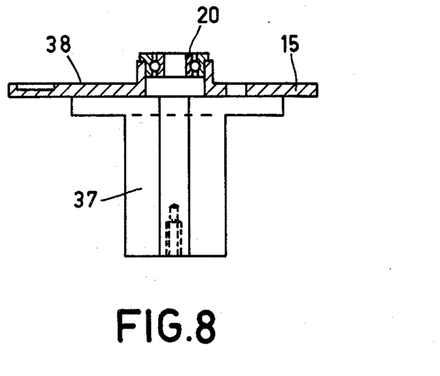
FIG. 8 is a sectional view, taken on the line VIII—VIII, of the base shown in FIG. 7.
Figure 9:
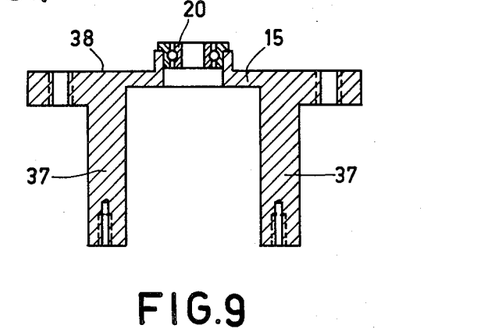
FIG. 9 is a sectional view, taken on the line IX—IX, of the base shown in FIG. 7, FIGS. 10, 11, and 12 are elevations of a coil for the swing-arm drive.

The ball-bearings 21 is mounted in the resilient bracket 22. Said bracket comprises an extruded cylindrical portion 34 for receiving the outer race of the ball-bearing 21, which cylindrical portion is connected to four strip-shaped members 35. This ensures that the resilient bracket presents a higher resistance to forces perpendicular to the pivotal axis 8 and moments about the pivotal axis 8 than to forces directed in accordance with the pivotal axis 8 and moments acting about axes perpendicular to the pivotal axis. By means of two screws 36 the bearing bracket is secured to two upright portions 37 of the base 15 under axial pre-load. When the bearing arrangement is mounted the bracket 22 is shifted until the optical axis of the lens system is perfectly perpendicular to the mounting face 38 on the upper side of the frame, see FIGS. 4, 8 and 9. Possible alignment errors of the two bearings 20 and 21 relative to each other are compensated by the resilient action of the bracket 22 and the axial pre-load eliminates any bearing play.

Figure 5:
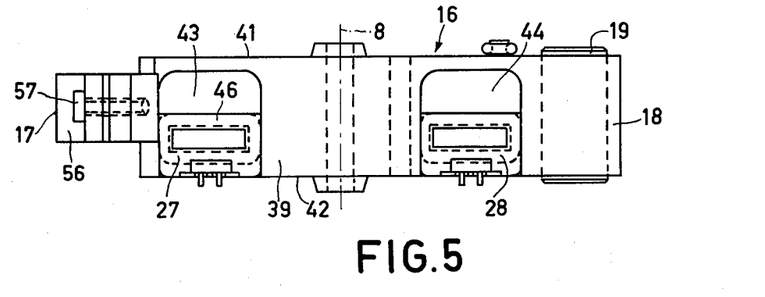
FIG. 5 is a side view of the swing-arm used in the device.
Figure 6:
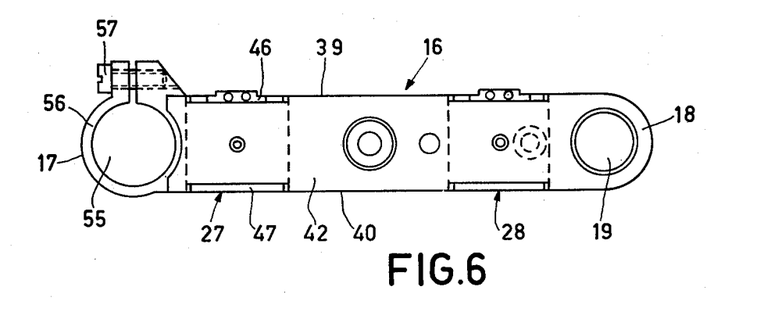
FIG. 6 is a bottom view of the swing arm of FIG. 5.
Figure 7:
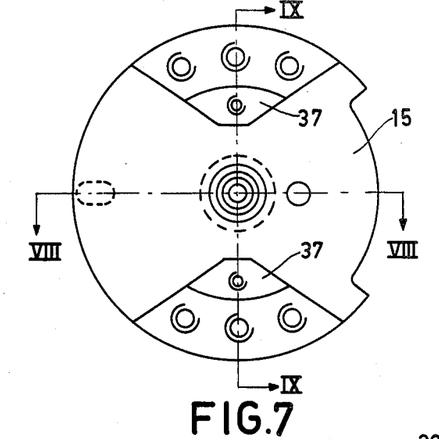
FIG. 7 is a bottom view of a base of the frame of the swing-arm device.
Figure 10:
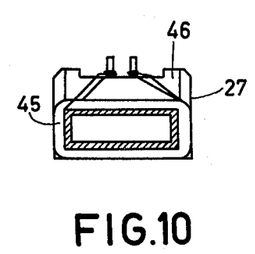
Figure 11:
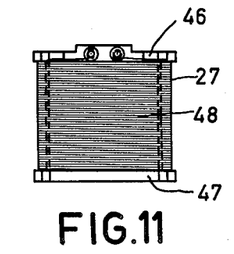
Figure 12:
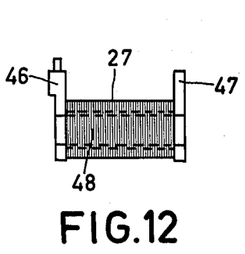

As is apparent from FIGS. 5 and 6, the swing arm 16 substantially has the shape of a bar of a rectangular cross-section, whose long sides are parallel to the pivotal axis 8, so that the bar comprises two side surfaces 39 and 40, an upper surface 41 to be directed towards the optical disk 3, and a lower surface 42 opposite the last-mentioned surface. The side surfaces 39 and 40 have a height greater than the width of the upper and lower surfaces. The swing arm is formed with holes 43 and 44, one on each side of and at equal distances from the pivotal axis 8, which holes extend through the side surfaces 39 and 40. The coils 27 and 28 are accommodated in said two holes. In FIGS. 10 to 12 only the coil 27 is shown, the coil 28 being identical to the coil 27. The coil 27 comprises a coil former with flanges 46 and 47. The turns of the coil are arranged on a central portion of the coil former. The width of the coil is such that it exactly fits in the hole in the swing arm, said swing arm being locally recessed on both sides to receive the flanges 46 and 47.

Figure 13:
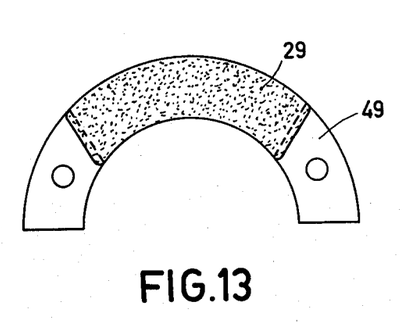
FIGS. 13 and 14 are elevations of a circularly arcuate permanent magnet arranged on a semicircular iron yoke portion of the permanent magnetic stator.
Figure 14:
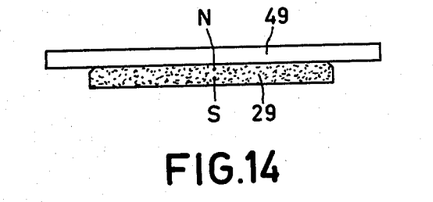
Figure 15:
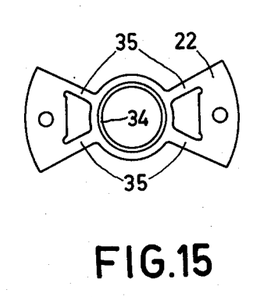
FIGS. 15 and 16 show a bearing bracket in elevation and in sectional view respectively.
Figure 16:
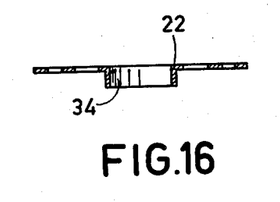

The permanent magnets 29 and 30 have the shape of arcs of circle and also extend through the holes 43 and 44. FIGS. 13 and 14 show the permanent stator magnet 29. Said magnet is glued onto a semicircular iron yoke member 49. The permanent magnet 30 is glued onto a similar yoke member 50. Identical semicircular yoke members 51 and 52 extend through the coils 27 and 28. In the present embodiment the stator magnets are axially magnetized. The yokes 49 to 52 are secured to the frame by means of bolts 53, spacers 54 being interposed. The field of the permanent magnet 29 extends the axially towards the iron yoke member 51 via the air gap in which the turns 48 of the coil 27 are disposed. The field is closed via the iron connecting portion 54 and the iron yoke member 49. The field of the permanent magnet 30 extends in a similar way.

Near the end 17, the swing arm 16 comprises a clamping device for mounting the scanning unit 6. This ensures easy and rapid exchangeability of said unit. The swing arm has a cylindrical bore 55, in which the scanning unit can be mounted. A clamping bracket 56 can be rightened around the scanning unit by means of a screw 57.

Figure 3:
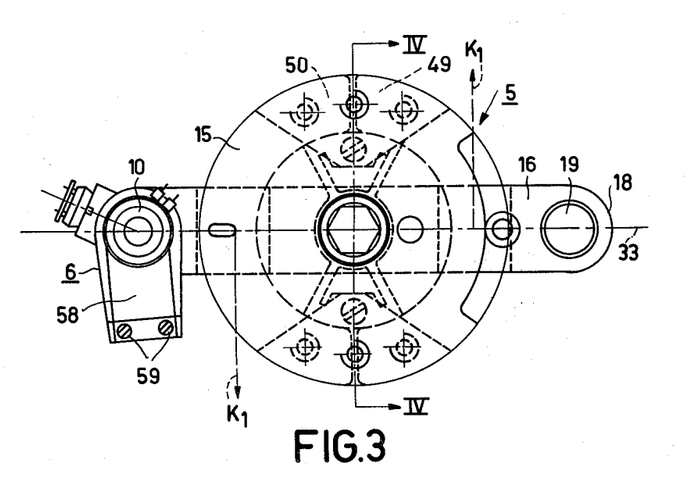
FIG. 3 is a plan view of the swing-arm device as shown in FIG. 2.
Figure 4:
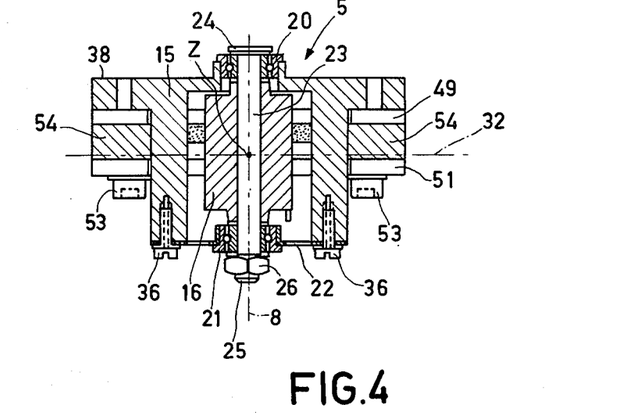
FIG. 4 is a cross-sectional view of the swing-arm device, taken on the line IV—IV in FIG. 3.

The lens system 10 is movable in accordance with the optical axis 9 and is suspended in two leaf springs 58, of which the lower one is visible in FIG. 3. Said leaf springs are secured to the other part of the scanning unit by screws 59 and are parallel to each other, so that the optical axis 9 is not subject to pivotal movements during the focussing movements. Relative to the pivotal axis 8 of the swing arm, the leaf springs extend substantially tangentially. Pivotal movements of the swing arm consequently subject the leaf springs to tensile and compressive loads. The leaf springs present a particularly high resistance to tensile and compressive loads, so that the pivotal movements hardly influence a correct operation. For driving the lens system there is provided an annular focussing coil 60, which co-operates with a permanent magnet system 6 which is coaxially mounted on the lens system.

As is shown in FIG. 1, the scanning path T of the read spot is an arc of circle, which extends between an outer point $B_1$ of the path and an inner point $B_2$ of the path, situated on a radius $R_1$ and a radius $R_2$ respectively. The angle α between the radii $R_1$ and $R_2$ is approximately 18°. In comparison with a scanning path between the points $B_1$ and $B_3$ situated on the radius $R_1$ the distance between the optical axis of the scanning unit and the pivotal axis is then reduced by a factor $1\frac{1}{2}$.

What is claimed is:

1. A swing-arm device for writing and/or reading recording tracks in a recording surface of a rotary optical disk by means of a radiation beam (13) which is concentrated to form a radiation spot (14), which device comprises:
    a stationary frame (15),
    an optical scanning unit (6) comprising a lens system (10) which is movable along an optical axis (9),
    a swing arm (16) having a first end provided with means for securing the scanning unit (6) and having a second end opposite the first end,
    a swing-arm bearing arrangement (20-26) for mounting the swing arm so as to be pivotable about a pivotal axis (8) between the two ends (16, 17),
    coil means (27, 28) connected to the swing arm for exerting electromagnetic pivotal forces in a plane perpendicular to the pivotal axis (8), and
    a permanent-magnetic stator comprising permanent stator-magnet means (29, 30) secured to the frame, which means co-operate with the coil means via an air gap, characterized in that
    the mass centre (Z) of the pivotal assembly, comprising the swing arm (16) with the optical scanning unit (6), is disposed on the pivotal axis (8),
    the coil means (27, 28) comprise first and second coil means which are each disposed on one side of and at equal distances from the pivotal axis (8), diametrically opposite each other, and which exert equal first and second pivotal forces ($K_1$), and
    the first and second pivotal forces ($K_1$) act in one plane perpendicular to the pivotal axis.

2. A swing-arm device as claimed in claim 1, characterized in that the centre of mass (Z) of said pivotal assembly is disposed in the said one plane.

3. A swing-arm device as claimed in claim 1, characterized in that the swing-arm bearing arrangement comprises two bearings, one on each side of the swing arm (16), which bearings are disposed at substantially equal distances from the mass centre (Z) of the said pivotal assembly.

4. A swing-arm device as claimed in claim 3, characterized in that
    the two bearings comprise ball-bearings (20, 21),
    the swing-arm bearing arrangement comprises a resilient bracket (22) for mounting one of the two ball-bearings (21), which bracket presents a higher resistance to forces perpendicular to the pivotal axis (8) and to moments about the pivotal axis and a lower resistance to forces directed in accordance with the pivotal axis and to moments about axes perpendicular to the pivotal axis, and the resilient bracket is secured to the frame under axial preload, so that the two ball bearings are axially urged towards each other.

5. A swing-arm device as claimed in claim 1, characterized in that the swing arm (16) has at least substantially the shape of a bar of rectangular cross-section, whose long sides are parallel to the pivotal axis (8), so that the bar comprises two side surfaces (39, 40), an upper surface (41) to be directed towards the optical disk (3) and a lower surface (42) opposite the last-mentioned surface, which side surfaces have a height which is greater than the width of the upper and lower surfaces, the swing arm is formed with first and second holes (43, 44), one on each side of the pivotal axis (8), which extend through the side walls (39, 40), the first and second coil means (28, 27) are mounted in the first and second holes (43, 44), and the stator is provided with first and second permanent stator magnets (29, 30) having the shape of arcs of circle, which magnets are passed through the first and second holes (43, 44).

6. A swing-arm device as claimed in claim 1, characterized in that the optical axis (9) of the movable lens system is disposed in a plane of symmetry of the swing arm (16) which extends through the pivotal axis (8) of the swing arm.

7. A swing-arm device as claimed in claim 1, the movable lens system being suspended in parallel leaf springs, characterized in that the leaf springs extend substantially tangentially relative to the pivotal axis.

* * * * *